UNITED STATES PATENT OFFICE 2,520,733

POLYMERS OF TRIMETHYLENE GLYCOL

Rupert C. Morris, Berkeley, and Alva Vance Snider, Richmond, Calif., assignors to Shell Development Company, San Francisco, Calif., a corporation of Delaware No Drawing. Application August 26, 1946, Serial No. 693,170

10 Claims. (Cl. 260—615)

This invention relates to new and useful lubricants, and more particularly pertains to non-hydrocarbon lubricants comprising or consisting of novel polymers and copolymers of trimethylene glycol, and its derivatives, and to a novel method of lubrication.

It is well known that certain alkylene oxides and glycols having two hydroxyl radicals on adjacent carbon atoms may be polymerized to form viscous liquids or wax-like polymers. The products obtained have the general configuration

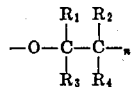

where $n$ is an integer and $R_1$ through $R_4$ are hydrogens or organic radicals such as methyl, ethyl, isopropyl, etc. radicals. Examples of alkylene oxides forming such polymers are ethylene oxide, propylene oxide, butylene oxide, etc. Glycols such as ethylene glycol form polymers practically identical with those obtained from the alkylene oxides. As pointed out above, these monomers and polymers have at least one part of their configuration in common: the oxygen atoms are separated by two carbon atoms, giving, in the case of ethylene oxide, polymers of the configuration

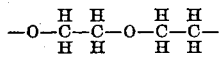

Typical of the polymers of the higher alkylene oxides is polypropylene oxide, having the configuration

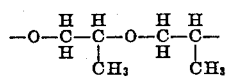

Polymers of butylene oxide and higher alkylene oxide differ from this latter configuration by the replacement of the methyl substituent or one or more of the hydrogens with other alkyl groups such as ethyl, propyl, etc. Hence, this whole series of polymers comprises essentially chains of pairs of carbon atoms linked by oxygen atoms.

One of the members of this group of polymers is polypropylene oxide, which is being utilized to a certain extent as a lubricant, replacing mineral oil lubricants for certain purposes, such as in hydraulic brake fluid compositions, etc. When used as an engine lubricant it has two advantages over mineral oil lubricants, namely, it leaves substantially no engine deposits, and has low pourpoints. However, the polyalkylene oxide and ethylene glycol polymers in general, and polypropylene oxide especially have one serious drawback limiting their utility as general lubricants. This is the serious susceptibility of polymers consisting of units of the general configuration

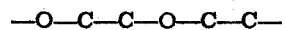

to oxidation during normal use, such as in lubricating compositions. This instability towards oxygen causes considerable loss of the product during its use, since, instead of forming gums as in the case of mineral oils, polymers of this configuration decompose upon oxidation or thermal cracking to form volatile materials which gradually escape from the lubrication system.

This tendency to oxidize and subsequently volatilize can be controlled to a limited extent by incorporation in the polymer of certain anti-oxidants. However, large percentages of these are required to maintain suitable stability. This causes undue lacquer formation on engine parts, due apparently to the stabilizer itself. Furthermore, even in the presence of considerable proportions of anti-oxidant materials, the polymers containing a predominating number of units having the

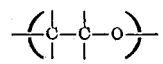

configuration continue to oxidize and volatilize to an unsatisfactory extent.

It is an object of this invention to provide non-hydrocarbon lubricants which do not have this disadvantageous tendency to oxidize. It is a further object of this invention to provide a process for the polymerization of trimethylene glycols. It is still another object of this invention to provide lubricating polymers containing a predominating number of units of the general configuration

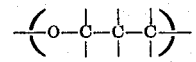

It is yet another object to provide polymeric materials useful as components in lubricating compositions etc. Other objects will be obvious from the following description of the present invention.

Now in accordance with this invention, polymeric lubricants having repeating units of the general essential configuration

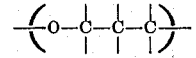

are prepared by heating, in the presence of dehydration catalysts, glycols having the general formula

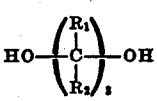

in which $R_1$ and $R_2$ are either hydrogens or organic radicals. By such a process, still in accordance with this invention, polymers useful for lubricating purposes are prepared, having a negligible tendency to oxidize during use.

The monomeric trimethylene glycols having the above general formula are derived from trimethylene glycol. Preferably, $R_1$ and $R_2$ are hydrogens. In such case, the polymers are formed from trimethylene glycol itself. If any of the R's are not hydrogens, they may be organic radicals such as alkyl, aralkyl, aryl, etc. Preferably, if they are not hydrogens they are hydrocarbon radicals, especially saturated lower aliphatic hydrocarbon radicals, but also may be groups which contain olefinic or acetylenic links. Typical of the trimethylene alkyl substituted glycols are the methylated trimethylene glycols, including 1-methylpropanediol-1,3; 2-methylpropanediol-1,3; 1,1-dimethylpropanediol-1,3; 1,2-dimethylpropanediol-1,3; 1,3-dimethylpropanediol-1,3; 2,2-dimethylpropanediol-1,3; 1,1,2-trimethylpropanediol-1,3; 1,2,2-trimethylpropanediol-1,3; 1,2,3-trimethylpropanediol-1,3; 1,1,2,2-tetramethylpropanediol-1,3; 1,1,3,3-tetramethylpropanediol-1,3; 1,2,3,3-tetramethylpropanediol-1,3; 1,1,2,2,3-pentamethylpropanediol-1,3; 1,1,2-3,3-pentamethylpropanediol-1,3; and hexamethylpropanediol-1,3.

In place of the methyl groups other alkyl groups may be utilized, such as ethyl, propyl, butyl, amyl, hexyl, heptyl, octyl, nonyl, decyl, etc., radicals, as well as their isomers. Preferably, when alkyl groups are the substituents $R_1$ and/or $R_2$, they have from 1 to 10 carbon atoms, and still more preferably from 1 to 5. It will be understood that $R_1$ and $R_2$ may be similar or dissimilar groups. Thus, when expanding the general formula given hereinbefore to its indicated number of carbon atoms, it then becomes

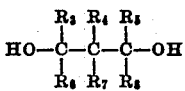

wherein $R_3$ through $R_8$ are either hydrogen atoms or similar or dissimilar organic radicals. The derivatives of trimethylene glycol, other than trimethylene glycol itself, which give the most satisfactory polymers for general use have at least 4 hydrogen substituents and less than 3 hydrocarbon substituents. Thus, 2-methylpropanediol-1,3 and 2,2-dimethylpropanediol-1,3 form excellent polymers when treated according to the method of the present invention.

Other lower alkyl substituted trimethylene glycols which polymerize readily are 1-methyl-2-ethylpropanediol-1,3; 2-methyl-2-ethylpropanediol-1,3; 1-methyl-3-ethylpropanediol-1,3; 2-methyl-2-propylpropanediol-1,3; 1-methyl-2-isopropylpropanediol-1,3; 2-methyl-2-butylpropanediol-1,3; 2-methyl-3-butylpropanediol-1,3; and the homologs, analogs and derivatives of the same.

Cycloaliphatic radicals may be one or more of the substituents represented by $R_3$ to $R_8$ in the above general formula. Thus, $R_3$ through $R_8$ may be such radicals as cyclohexyl, methylcyclohexyl, dimethylcyclohexyl, ethylcyclohexyl, etc. However, open-chain saturated aliphatic hydrocarbon substituents give polymers having preferred properties.

The polymers have modified properties when the trimethylene glycol derivative contains other active groups or elements, such as additional hydroxyl, or carbonyls, alkoxy, carboxyls, halogens, sulfur, selenium, tellerium, phosphorus, nitrogen, etc.

While the lubricants formed may be prepared from trimethylene glycol alone, or from a single trimethylene glycol derivative, copolymers also may be prepared in order to vary the properties of the polymer for a particular purpose. Thus, trimethylene glycol may be polymerized with one or more trimethylene glycol derivatives, or two or more trimethylene glycol derivatives may be co-polymerized. While any proportions of the monomers may be employed in preparing the copolymeric materials, copolymers having greater than about 10 parts of one monomer to 1 part of the other (or others) usually show no substantial difference in properties from a polymer prepared from the first monomer alone. Therefore, it is a preferred practice, when preparing copolymers to use proportions of monomers from about 10:1 and about 1:1. Copolymers having monomer ratios of 5:1 and of 6:4, as well as 1:1, show well defined differences in properties from polymers prepared from any single trimethylene glycol monomer.

The lubricants comprising the present invention are prepared by heating trimethylene glycol and/or its derivatives defined hereinbefore in the presence of certain catalysts. Since the mechanism of the polymerization is one involving dehydration as an intermediate step, dehydration catalysts are employed. These include iodine, inorganic acids such as halogen acids, sulfuric acid and phosphoric acid and organic acids, particularly sulfonic acids. Examples of dehydration catalysts are hydrogen chloride, hydrogen bromide, hydrogen iodide, aromatic sulfonic acids such as para-toluene sulfonic acid, benzene sulfonic acid, acid-acting salts such as alkali metal acid sulfates or phosphates, including sodium bisulfate, aluminum sulfate, potassium acid phosphate, etc.

The catalysts may be employed in solid, liquid or gaseous form, or may be present as an aqueous or organic solution. Hydrogen iodide, for example, is conveniently utilized in the present process as a concentrated aqueous solution, initially containing about 50% water. Others, such as the sulfonic acids, may be added as solids, liquids, or in either organic or aqueous solutions.

Dependent upon the nature of the monomer the identity of the catalyst, the temperature of the polymerization reaction and the polymerization rate desired, the catalyst may be used in ratios with the monomer varying from about 1:500 to 1:10. Preferably, however, the ratio of catalyst is confined to the range from about 1:200 to 1:25, but a ratio of 1:100 gives satisfactory results in most circumstances.

The polymerization reaction may take place in either liquid, solution, emulsion or gaseous phases. Hence, it is possible, and frequently even advisable, to use either liquid or gaseous diluents, especially if active catalysts such as boron trifluoride or aluminum chloride are present during the polymerization. Liquid diluents may perform several functions, acting as solvents for the monomer and/or the polymer, as solvents for the catalyst, as azeotropic constituents for carrying off water formed during the polymerization, as diluents for the control of polymerization rate, or, by their boiling points, as controls for the temperature of the reaction, as one phase of an emulsified reaction mixture, etc. Gaseous diluents are used primarily when the polymerization is carried out in gaseous phase, but also may be injected to carry off the water formed during polymerization, or as coolants, etc.

Both gaseous and liquid diluents are preferably substantially inert toward the other components of the reaction mixture in the temperature range encountered prior to, during and after reaction. The most satisfactory diluents are hydrocarbons of either aromatic or aliphatic character, but preferably are saturated aliphatic hydrocarbons. When the diluent is to be used in an aqueous phase polymerization, it is preferably chosen from the group of hydrocarbons boiling between about 125° C. to about 300° C., especially if it is to be used in azeotropic distillation of water during polymerization. Hydrocarbons which serve as suitable diluents include the dihydronaphthalenes; cycloheptane, the decanes, including 2-methyl nonane and 2,6-dimethyloctane; the octanes, including 2,2,3-trimethylpentane and 2 - methyl - 3 - ethylpentane; the nonanes, such as 2-methyloctane, 2,4-dimethylheptane, 4-ethylheptane, the dodecanes such as dihexyl or 2,4,5,7-tetramethyloctane, etc.

When the polymerization is carried out in gaseous phase, the diluent may be a lower hydrocarbon such as methane, ethane, propane, butane, etc., which acts as a regulator or diluent for the reaction, but which can be stripped from the product with facility, subsequent to the polymerization.

The proportion of diluent is not a critical factor in carrying out the process of the present invention. However, it is a preferred practice to keep the reaction mixture as concentrated as possible, consistent with maintaining homogeneity, rate of polymerization, etc. Ordinarily, when a diluent is used for a liquid phase polymerization the initial proportion of diluent to glycol is from about 1:1 to about 20:1, but preferably is initially from about 2:1 to about 5:1. When the temperature of the reaction is substantially below the boiling point of the diluent, this ratio will remain unchanged throughout the reaction. If, however, the conditions are such that water formed by dehydration of the trimethylene glycols during polymerization distills azeotropically with part of the diluent, it is preferred to arrange a return inlet so that the diluent passing over in the azeotrope may be replaced in or near the polymerization zone, so as to maintain a substantially constant diluent to glycol ratio.

Other ingredients may be included in the polymerization mixture, or may be added from time to time during the polymerization. For example, the polymerization may be carried out in a closed system, such as an autoclave. In such a case, the water formed during the polymerization may be effectively removed by the presence of dehydrating agents which will combine with or absorb the water as it is formed. Inert gases such as nitrogen may be added to protect the hot polymerization mass from oxidation. Reactants, such as alcohols, may be present for the purpose of converting the hydroxyl radicals normally present on both ends of the polymer chains to other functional groups, as more particularly set forth hereinafter.

The temperature of polymerization may vary within a relatively wide range; but, unless the reaction mixture is substantially above about 150° C., only a negligible amount of polymerization occurs, at least within a reasonable reaction period. If the reaction temperature is substantially above about 300° C., decomposition of the monomeric glycols and of the polymers takes place to such an extent that undue losses occur and the product requires extensive purification. The preferred polymerization temperature range is from about 170° C. to 225° C., with the optimum range being from about 175° C. to about 200° C. Trimethylene glycol boils at 214° C., and alkylated trimethylene glycols boil at somewhat higher temperatures. Therefore, it is a preferred practice to conduct the polymerization at temperatures somewhat below the point at which the glycols will commence distilling; however, if higher temperatures are employed, the apparatus may be arranged so as to return the distilled glycols to or near the polymerization zone.

When the polymerization is carried out by disposing all of the reactants in a vessel and heating with continuous or intermittent distillation of water, the reaction time required to obtain products having molecular weights of about 200 or more is at least about 2 hours, and usually is about 6 hours, or even longer. Under a given set of conditions the molecular weight of the polymer varies directly with the amount of water formed, since a molecule of water is formed for every additional —C—C—C—O— link added to the polymer chain. Consequently, the average molecular weight of the polymeric product can be readily calculated by the amount of water which has been distilled out of the polymerization zone.

Following the polymerization period, the product is usually purified. The first step in purification is the removal of the catalyst. If this is a solid, suspended in the liquid polymer or a solution of the polymer, a simple filtration is all that is required. When the catalyst is in solution other means must be employed. For example, when sulfonic acids are the catalysts used, a preferred method for their removal from the polymer comprises dissolving or thinning the polymer with an organic solvent such as benzene, washing with concentrated caustic to convert the acid to the sodium salt, and subsequently extracting with water to remove the sodium salts of the acids and any remaining traces of caustic.

After removal of the catalyst, the product may be dehydrated in order to remove the last traces of water formed during polymerization and any water remaining from catalyst extraction operations. Water may be removed by the use of dehydrating agents, or by distillation, preferably under a subatmospheric pressure. If this latter method is employed, any solvents present and any monomeric trimethylene glycols may be removed at the same time. Consequently, at the end of these operations there remains the polymerized trimethylene glycol, free of solvents, water and catalyst.

One phenomenon peculiar to the polymerization of trimethylene glycols is the production of color bodies which lower the quality of the product for some purposes. These color bodies are not soluble in the ordinary extraction media, such as organic solvents and hydrocarbon fractions. Furthermore, the removal of the color by means known to the art fails, when the commonly known oxidizing agents, such as permanganates or peroxides are employed. Other ordinary bleaching procedures heretofore utilized such as treatments with various activated carbons, activated aluminas, silica gels, or extraction with steam or toluene, also fail to improve the color of the trimethylene glycol polymers. All of these methods and agents readily decolorize glycerine, for example, but since they fail to improve the color of the subject polymers, it is assumed that the color bodies are of a character not encountered heretofore.

However, in accordance with one phase of this invention, it has been found that a major portion of the color bodies may be removed by a combination treatment, comprising initially percolating the dehydrated polymer through fuller's earth, and subsequently subjecting it to hydrogenation. By this combination treatment polymers of the trimethylene glycols are obtained having a light yellow color, as compared with the dark brown or black masses initially obtained by the polymerization described.

Percolation through fuller's earth is preferably carried out in an inert solvent, suitably a hydrocarbon such as benzene, toluene, xylene, etc. The percolation is preferably carried out at room temperature or below, but may be conducted at elevated temperatures, as long as the temperature and pressure adjustments are such as to prevent boiling of the solvent and consequent deposition of the polymer in the percolation tower. This percolation treatment results in the production of polymers having improved colors satisfactory for many purposes, in which case all that remains to be done is to flash off the solvent in order to recover the polymer.

On the other hand, polymers having the least color can be obtained only by following the percolation with hydrogenation. Neither percolation alone, nor hydrogenation alone, nor any of the ordinary decolorizing or bleaching procedures, results in the formation of light colored trimethylene glycol polymers such as those obtained by treatment with fuller's earth followed by hydrogenation.

In carrying out the percolation through fuller's earth, oxygen-containing solvents such as acetone, methyl alcohol and dioxane are relatively ineffective for aiding in the removal of color from the subject polymers. The color removal appears to be specific in that hydrocarbon solvents, and especially aromatic hydrocarbon solvents are required, benzene and toluene giving the best results.

The hydrogenation step is essential for the reduction of color-sensitive functional groups, supposedly carbonylic in character. Raney nickel, nickel sulfide, copper, palladium, platinum and other catalysts suitable for the reduction of carbonyls may be used, although Raney nickel is preferred. Temperatures employed vary from about 50° C. to about 275° C., and hydrogen pressures from about 500 to about 3000 lb. per square inch are utilized. Subsequent to hydrogenation, the catalyst may be removed from the product, e. g. by super-centrifuging or filtration, and any solvents present may be flashed off to yield the light yellow polymer or copolymer of trimethylene glycol or substituted trimethylene glycols.

The polymers formed from the trimethylene glycols as described hereinbefore have hydroxyl groups on both ends of each polymer chain. These hydroxyls may be acted upon with such materials as etherifying or esterifying agents in order to obtain products having altered properties, such as solubility or improved action as lubricants, plasticizers, etc.

Various etherifying agents may be used for etherifying terminal hydroxyls. These include alkyl halides, such as methyl iodide, methyl bromide, ethyl chloride, propyl iodide; aralkyl halides such as benzyl chloride and methylbenzyl chloride; hydroxyalkyl chlorides such as hydroxyethyl chloride; carboxyalkylating agents such as sodium monochloracetate; and alkylene halides such as allyl chloride. Ordinarily, the etherification is carried out in strongly basic environments; sodium hydroxide, liquid ammonia and quaternary ammonium bases and salts being the usual basic substances present.

Esterification of the terminal hydroxyls may be accomplished with various inorganic groups such as nitrates, phosphates or sulfates. However, preferred esterifying agents are the organic acids anhydrides or acid chlorides, and especially fatty acid anhydrides and their chlorides, including for example formic, acetic, propionic, butyric, hexoic, 2-ethylhexoic, and higher fatty acids such as lauric, stearic, myristic, palmitic and capric acids. Usually, the esters are formed by treatment of the hydroxylated polymer with the anhydride of the acid in the presence of a catalyst such as sulfuric or phosphoric acid. The saturated fatty acids form the most stable esters with the trimethylene glycol polymers.

At times it is preferable to allow only partial etherification, or esterification thus forming half-ethers or half-esters instead of the di-ethers or di-esters theoretically possible. For other purposes the end-group hydroxyls may not only be partially or completely esterified or etherified, but also may be treated so as to result in the formation of mixed ethers, mixed esters or ether-esters.

Etherification or esterification of the end-groups may take place simultaneously with or subsequent to polymerization, and may be effected prior to or subsequent to the decolorizing and purifying processes described hereinbefore. Preferably, the end-group modification is carried out immediately after polymerization and before purification or decolorizing, but a secondary preferred time for modification is during the polymerization step itself.

When carrying out this latter step the exact mechanism by which substitution of the end-groups occurs is obscure. However it has been discovered, in accordance with this invention, that by using an active modifying agent, such as an alcohol, as the diluent during the polymerization, reaction occurs to give polymers having at least one substituted end-group, such as an ether group or ester group. For example, if alcohols such as n-octyl alcohol, n-decyl alcohol, n-dodecyl alcohol, etc., or their homologs, analogs, or isomers, are used as diluents during the polymerization, the corresponding ethers of the polymers are formed. Since this provides a convenient method for modifying the properties of the polymer, it is preferred that the alcoholic diluent, or other modifying agent, have from about 6 to about 20 carbon atoms. The reactive diluent may be the only diluent present, or may be mixed with one or more inert diluents.

The polymers comprising the lubricants of the present invention have the general unit configuration

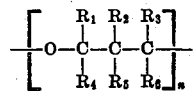

wherein $n$ is an integer greater than 1, and $R_1$ through $R_6$ represent the hydrogen atom or organic radicals. This general formula includes for example the polymers of trimethylene glycol, the polymers of substituted trimethylene glycols, and the copolymers of trimethylene glycol and/or substituted trimethylene glycols. Where, throughout the specification and claims, an expression similar to "trimethylene glycol polymers" is employed, said expression is intended to mean polymers of the above general configuration and particularly those of the three subclasses of polymers itemized above. While the groups $R_1$ through $R_6$ in the above formula may contain elements other than carbon and hydrogen, such as oxygen, sulfur, selenium, tellerium, phosphorous, nitrogen, etc., it is preferred that $R_1$ through $R_6$ are either hydrogen or hydrocarbon radicals.

When trimethylene glycol is the monomeric starting material, and when the end-groups are unmodified, the polymers have the configuration

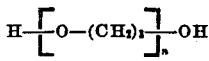

When the end groups are etherified or esterified, the polymers of trimethylene glycol will have the configurations

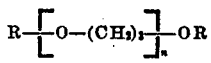

and

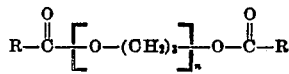

or

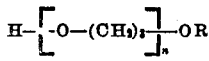

and

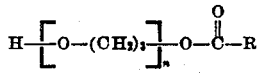

wherein the groups O—R are ether radicals and the groups

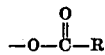

are ester radicals.

In the case of homopolymeric trimethylene glycols, the groups

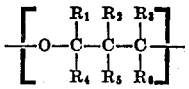

are identical units repeated continuously throughout the molecule, but when copolymers are formed the above general formula units may be dissimilar in nature. Thus, if the copolymer is formed of a 1:1 ratio of trimethylene glycol and beta-methyltrimethylene glycol, two adjacent units will have the configuration

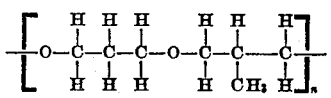

Polymers of the above general configuration having the most general utility are those in which $R_1$ through $R_6$ are hydrogens or lower alkyl groups, and preferably those in which at least 4 of the R's of each unit are hydrogens.

The products of the present invention vary from thin non-viscous liquids to viscous oils, and, if the molecular weight is great enough, products which are gels or solids at room temperature are formed. The trimethylene glycol polymers may be of any molecular weight, dependent at least in part upon the extent to which the intermediate glycol dehydration is carried. Polymers having molecular weights from about 100 to about 10,000 are readily prepared, but those having molecular weights between about 200 and 1500 are preferred since they have properties of viscosity and solubility which give them extensive utility.

Trimethylene glycol polymers having molecular weights below about 200 are generally water-soluble, or at least are affected by water. Those having higher molecular weights, above about 200, are soluble in the usual organic solvents, such as aromatic hydrocarbons, esters, ethers and alcohols. The solubility of the polymer varies with (a) molecular weight; (b) identity of the monomer; and (c) end-group modification. If the monomer is trimethylene glycol itself, polymers of somewhat higher molecular weight, i. e. 200–300 are water-soluble, or at least water-sensitive. If, however, the polymer, and especially those having molecular weights below about 1100, have end-groups of substantial size, such as a n-decyl ether group, the properties such as solubility, etc., may be substantially modified.

When the molecular weight is less than about 1500, the polymers have freezing points varying from about $+40°$ C. to about $-70°$ C. Again, this property varies with the three factors given in the paragraph above. For example an unmodified polymerized trimethylene glycol of average molecular weight has a freezing point from about $+10°$ C. to about $-10°$ C. On the other hand a copolymer of 80 parts trimethylene glycol and 20 parts beta-methyl-trimethylene glycol of similar molecular weight has a freezing point lower than $-75°$ C.

The trimethylene glycol polymers have viscosity characteristics which make them useful as lubricants. Polymers having molecular weights between about 200 and about 1500 have viscosities from about 30 to about 400 centistokes at 100° F., and from about 4.5 to about 50 centistokes at 210° F. These viscosities correspond to lubricating oils having S. A. E. numbers from about 10 to about 80.

Another important viscosity characteristic possessed by the trimethylene glycol polymers is their excellent viscosity indices. Dependent upon the three variables of molecular weight, monomer identity, and end-group modification, the viscosity index may be varied from about 100 to about 165, or even higher. For example, while the viscosity index of a polymer of trimethylene glycol having a molecular weight of about 300 is about 113, a similar polymer having a molecular weight of about 1000 has a viscosity index of about 136. Again, by acetylating the end-groups of a trimethylene glycol polymer having an original viscosity index of 124, the viscosity index is raised to 165.

The resistance of the trimethylene glycol polymers to oxidation is outstanding especially in comparison with the relatively poor stability of the polymers formed from the epoxides such as propylene oxide or 1,2-dihydroxy type of glycols. As pointed out hereinbefore, the reason for this exceptional difference in relative stabilities has not been definitely ascertained, but tentatively is presumed to be due to the greater spacing of oxygen linkages in the trimethylene glycol polymers.

Thus, when oxidizing a propylene oxide polymer in the absence of any inhibitor (140° C., initial oxygen pressure of 50 p. s. i., 1 sq. cm. copper per gram of polymer), the oxygen pressure dropped 10 pounds in 1.3 hours and 20 pounds in 2.1 hours. When a polymer of trimethylene glycol was oxidized under the same conditions it required 14 hours for the oxygen pressure to drop 10 pounds, and 29 hours for it to drop 20 pounds. Thus, the trimethylene glycol polymer unexpectedly oxidized at a rate less than about 10% of that of the propylene oxide polymer.

The response of the trimethylene glycol polymers to the presence of certain oxidation inhibitors likewise is outstanding in comparison with polymers having repeating units of the general configuration

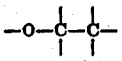

For example, the propylene oxide polymer noted above, when inhibited with 1% phenyl-alpha-naphthylamine and oxidized as before, allowed a 10 pound oxygen pressure drop in 13 hours. For comparison, the trimethylene glycol polymer described in the preceding paragraph was inhibited with 1% phenyl-alpha-naphthylamine and oxidized in the same manner. Under these conditions the oxygen pressure dropped only about 7 pounds after 100 hours of oxidation, at which time the test was discontinued. This unexpected response to amines, and particularly primary and secondary aromatic amines, is evidence that the mechanism of stabilization of the trimethylene glycol polymers is apparently different from that of the stabilization of polymers containing repeating units of the

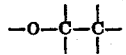

configuration. Other amines imparting outstanding stability to the trimethylene glycol polymers include the n-alkylated para-phenylenediamines and the poly-nuclear aromatic amines, such as n-butyl-para-phenylenediamine, n,n'-di-butyl-para-phenylenediamine, alpha- and beta-naphthylamine, phenyl-beta-naphthylamine, alpha, alpha-, beta, beta-, or alpha,beta-dinaphthylamine, etc. The presence of from about 0.05 to about 8.0% (by weight) of an amine results in trimethylene glycol polymers having outstanding stability toward oxidation. The optimum inhibitor concentration is from about 0.5% to about 5.0% (by weight).

The polymers of the present invention are suitable for a number of important uses, such as engine lubricants, hydraulic brake fluids, instrument oils, stand-by oils, grease bases, plasticizers for nitrocellulose, cellulose ethers, cellulose esters, methacrylate polymers, phenol-formaldehyde resins, etc. The compatibility of the trimethylene glycol polymers with resins or cellulose derivatives is controlled by the molecular weight of the polymer, the identity of the monomer or monomers from which it is made, and the modification of the end-groups. For instance, the combination of trimethylene glycol polymers and methacrylate polymers generally results in the incompatible mixture of the components. However, by etherifying at least one of the end-group hydroxyls of polymeric trimethylene glycol with a long chain alcohol, such as n-decanol, the polymer then can be mixed with a methacrylate polymer, such as polylauryl-methacrylate, in substantially any proportions, to give lubricating compositions of high viscosity and very high viscosity index.

The trimethylene glycol polymers are primarily useful for lubrication purposes, since they have such excellent stability toward oxidation, and leave practically no engine deposits. Table I demonstrates the utility of polymerized trimethylene glycol as an extreme pressure lubricant, both with and without oleic acid. The four-ball apparatus by Boelage, described in "Engineering," July 14, 1933, was employed for the tests. Results are compared with those obtained with polymerized propylene oxide:

TABLE I

| Polymer | Per Cent oleic acid | 80° C. | | | 130° C. | | |
|---|---|---|---|---|---|---|---|
| | | D | ui | u | D | ui | u |
| Propylene oxide | 0 | 0.25 | 0.066 | 0.087 | 0.26 | 0.080 | 0.079 |
| Do | 5 | 0.27 | 0.082 | 0.079 | 0.29 | 0.072 | 0.065 |
| Trimethylene glycol | 0 | 0.25 | 0.070 | 0.076 | 0.24 | 0.072 | 0.072 |
| Do | 5 | 0.28 | 0.052 | 0.049 | 0.31 | 0.046 | 0.042 |

D = average scar diameter.
Coefficient of friction: ui = after 5 seconds.
Average coefficient of friction after 10: u = 20, 30, 40, 50 and 60 seconds.

The trimethylene glycol polymers are excellent engine lubricants since they may be used for extended periods of operation without fouling the engine, and without changing substantially in molecular weight, viscosity, or viscosity index. When the subject polymers are employed as lubricants they may contain additives such as extreme pressure additives, anti-oxidants, anti-corrosion agents, pour-point depressors, etc.

Having described the general characteristics, preparation, properties and uses of the trimethylene glycol polymers, examples now are presented illustrating specific embodiments of the invention, especially of the polymerization process and of the polymers so formed:

EXAMPLE I

*Polymerization of trimethylene glycol, using iodine as catalyst*

Seven hundred parts trimethylene glycol and three parts iodine were placed in a reaction kettle attached directly to a still that provided a full take-off with substantially no reflux. The reaction mixture was warmed and the water that distilled was recovered. By maintaining the reaction temperature between 175° C. and 200° C., 175 parts of water were recovered in 72 hours. When heating was discontinued, the reaction mixture was dissolved in benzene, and subsequently washed with 48 Bé. caustic and then with water. The polymer was recovered by flashing off the benzene and drying at 100° C. under 1-2 mm. Hg pressure. The polymer was 527 parts of a water-soluble brown oil.

A second polymerization was carried out similar to that above, except that a greater amount of water was distilled out of the polymerization mass in order to obtain a polymer having a higher molecular weight. Table II gives some properties of these polymers.

TABLE II

*Iodine catalyzed trimethylene glycol polymers*

| | | |
|---|---|---|
| Molecular weight | 418 | 760 |
| Viscosity, centistokes at 100° F | 79.5 | 141 |
| Viscosity, centistokes at 210° F | 10.8 | 19.9 |
| Viscosity index | 124 | 135 |

EXAMPLE II

*Polymerization of trimethylene glycol, using HI as catalyst*

The polymerization carried out as described in Example I was repeated, with the exception that HI was employed as the catalyst. The HI was added as a 50% aqueous solution 0.025 part HI being employed for each part of trimethylene glycol. The reaction proceeded more rapidly than when $I_2$ was the catalyst. Five polymers were prepared. The molecular weight was varied by distilling out different amounts of water from the polymerization mixture. The polymerization temperature in each case was about 200° C. Table III gives the properties of these polymers.

TABLE III

*Trimethylene glycol polymers, HI catalyzed*

| | | | | | |
|---|---|---|---|---|---|
| Molecular weight | 290 | 370 | 505 | 955 | 1,095 |
| Viscosity, centistokes 100° F | 50.7 | 64.6 | 117 | 180 | 235 |
| Viscosity, centistokes 210° F | 8.0 | 8.6 | 16.5 | 28.9 | 34.0 |
| Viscosity index | 129 | 113 | 134 | 140 | 136 |

EXAMPLE III

*Polymerization of trimethylene glycol, using para-toluenesulfonic acid catalyst and a diluent*

Trimethylene glycol was polymerized according to the process given in Example I, except that para-toluenesulfonic acid was the catalyst, and decalin was employed as an azeotroping diluent. The catalyst was used in the ratio of 0.04 part per part of trimethylene glycol. The initial ratio of decalin to trimethylene glycol was 1:1.

A second polymerization was performed, identical with that above except that 0.06 part catalyst per part trimethylene glycol was used. The products were dark oils having the properties given in Table IV, below.

TABLE IV

*Para-toluenesulfonic acid catalyzed trimethylene glycol polymers*

| | | |
|---|---|---|
| Parts catalyst per part glycol | 0.04 | 0.06 |
| Molecular weight | 216 | 404 |
| Viscosity, centistokes 100° F. | 48.2 | 76.7 |
| Viscosity, centistokes 210° F. | 6.8 | 12.3 |
| Viscosity index | 104 | 139 |

EXAMPLE IV

*Polymerization of trimethylene glycol, $H_2SO_4$ catalyst*

The polymerization of trimethylene glycol was carried out by a process similar to that described, except that sulfuric acid was the catalyst employed. The ratio of concentrated sulfuric acid was 0.04 parts per part of trimethylene glycol. The polymer obtained was almost black, had a molecular weight of 346 and a vicosity of 53.5 centistokes at 100° F.

EXAMPLE V

*Acetylation of a trimethylene glycol polymer*

The reaction mass from a polymerization carried out as in Example III and containing polymerized 500 parts trimethylene glycol and 5 parts para-toluene sulfonic acid, was diluted with 500 parts benzene. Twenty parts acetic anhydride was added, and the mixture was refluxed under a separating still-head until complete water had been effected. The reaction mass then was washed 4 times with water, 300 parts each. The acetylated polymer was recovered by distillation of the benzene, followed by drying of the oil at 100° C. under 1-2 mm. pressure. The properties of the original trimethylene glycol polymer and the acetylated derivative are given in Table V, below.

TABLE V

*Change in properties by acetylating polymerized trimethylene glycol*

| | Unacetylated Polymer | Acetylated Polymer |
|---|---|---|
| Molecular weight | 418 | 492 |
| Viscosity, centistokes 100° F | 79.5 | 25.8 |
| Viscosity, centistokes 210° F | 10.8 | 5.8 |
| Viscosity index | 124 | 164 |

EXAMPLE VI

*Methylation of polymerized trimethylene glycol*

Three hundred parts polymerized trimethylene glycol was dissolved in 532 parts toluene and brought to reflux. Twenty-six parts metallic sodium was gradually added, after which refluxing was continued until complete solution took place. The solution of the sodium salt of the polymer then was heated at 105° C. in an autoclave with 233 parts methyl bromide for 16 hours. The sodium bromide formed was filtered, and the filtrate washed with dilute alkali, dilute HCl and water. The methylated polymer was recovered by distilling the solvent and drying the product at 100° C. under 1-2 mm. Hg. pressure. The product had a viscosity at 100° F. of 44.2 centistokes, and a viscosity index of 135.

EXAMPLE VII

*Preparation of the 2-ethylhexoate of polymerized trimethylene glycol*

A polymerization reaction mixture obtained as described in Example III containing 194 parts polymerized trimethylene glycol (mol. wt. 330) and 5 parts para-toluenesulfonic acid was diluted with 300 parts benzene and refluxed under a separating stillhead in the presence of 130 parts 2-ethylhexic acid until no further distillation of water occurred. The residue was washed 4 times with water. The polymer derivative was recovered by distillation of the solvent and drying under diminished pressure. The viscosity index of the 2-ethylhexoate was 158, while that of the polymer before esterification was 130.

EXAMPLE VIII

*Copolymerization of trimethylene glycol and beta-methyltrimethylene glycol*

Eight hundred parts trimethylene glycol and 200 parts beta-methyltrimethylene glycol were heated at 175° C. under a distilling head in the presence of HI (20 parts) for 72 hours.

The product was dissolved in benzene, extracted with concentrated caustic, and washed with water. After distillation of the solvent, the copolymer was dried by heating at 100° C. under a pressure of 1-2 mm. Hg. The product was a brown oil, with a freezing point less than —75° C., and a molecular weight of 965.

EXAMPLE IX

*Copolymerization of trimethylene glycol and 2,2-dimethylpropanediol-1,3*

The reaction described in Example VIII was repeated, using 800 parts trimethylene glycol and 200 parts 2,2-dimethylpropanediol-1,3. The product had a molecular weight of 406, a freezing point of less than −75° C. and a viscosity index of 114.

EXAMPLE X

*Percolation of polymerized trimethylene glycol through fuller's earth*

A polymerization mass obtained as in Example II was dissolved in benzene (1 volume of polymer to 2 volumes benzene) and percolated through five batches of fuller's earth (equal weights of polymer and each batch of fuller's earth). The product was isolated by removing the solvent under diminished pressure. The initial polymer had a Gardner color greater than 18. The polymer treated with fuller's earth had a 12 Gardner color.

EXAMPLE XI

*Hydrogenation of 2-ethylhexoate of trimethylene glycol polymer*

The polymer obtained in Example VII was hydrogenated in the presence of Raney nickel at 125° C. and 1500 pounds pressure. While the starting material had 13 Gardner color, the hydrogenated product had 8 Gardner color.

EXAMPLE XII

*Preparation of n-decyl ether polymer of trimethylene glycol*

A mixture of 250 parts trimethylene gylcol, 66 parts n-decanol and 10 parts HI (50% aqueous solution) was heated under a distilling head at 160–220° C. After 8 hours reaction 55 parts of water had distilled. The reaction mixture was diluted with benzene (500 parts), percolated through fuller's earth and hydrogenated as described in Example XI. The product was the mono-decyl ether of polymerized trimethylene glycol. It had 475 molecular weight, −25° C. freezing point, 40.6 centistokes viscosity at 100° F. and 138 viscosity index.

We claim as our invention:

1. A process for the preparation of polymeric materials which comprises heating trimethylene glycol at a temperature from about 175° C. to about 300° C. in the presence of from 2.5% to 6% by weight of said glycol of an acid-acting catalyst, whereby a mixture of polymers of said glycol is formed, said mixture having an average molecular weight from about 200 to about 1500.

2. A process according to claim 1 wherein the catalyst is a strong mineral acid.

3. A process according to claim 1 wherein the catalyst is an organic sulfonic acid.

4. As a new composition of matter, a mixture of polymers of trimethylene glycol, said mixture having an average molecular weight between 200 and 1500, said mixture of polymers having been prepared by the process according to claim 1.

5. The process of preparing a stable lubricant which comprises polymerizing trimethylene glycol in the presence of n-decanol and from 2.5% to 6% by weight based on the trimethylene glycol of para-toluenesulfonic acid at a temperature from about 160° C. to about 220° C., continuously removing the water formed during polymerization; forming a solution of the polymer so prepared in a hydrocarbon solvent; percolating said solution through fuller's earth; hydrogenating the polymer; and subsequently isolating the polymer.

6. A process for the preparation of polymeric materials which comprises heating trimethylene glycol at a temperature from about 150° C. to about 300° C. in the presence of 2.5% to 6% by weight of an acid-acting catalyst whereby a mixture of polymer of said glycol is formed, said mixture having an average molecular weight from about 200 to about 1500.

7. A process for the preparation of polymeric materials which comprises heating trimethylene glycol at a temperature from about 170° C. to about 225° C. in the presence of 2.5% to 6% by weight of an acid-acting catalyst whereby a mixture of polymer of said glycol is formed, said mixture having an average molecular weight from about 200 to about 1500.

8. A process for the preparation of polymeric materials which comprises heating trimethylene glycol at a temperature from about 150° C. to about 300° C. in the presence of an aliphatic alcohol having from 6 to 20 carbon atoms and 2.5% to 6% by weight of an acid-acting catalyst whereby a mixture of polymers of said glycol is formed, said mixture having an average molecular weight from about 200 to about 1500.

9. A process for the preparation of polymeric materials which comprises heating trimethylene glycol at a temperature from about 150° C. to about 300° C. in the presence of 2.5% to 6% by weight of an acid-acting catalyst whereby a mixture of polymers of said glycol is formed, said mixture having an average molecular weight from about 200 to about 1500, forming a solution of said polymers in a hydrocarbon solvent and percolating the solution through fuller's earth.

10. A process for the preparation of polymeric materials which comprises heating trimethylene glycol at a temperature from about 150° C. to about 300° C. in the presence of 2.5% to 5% by weight of an acid-acting catalyst whereby a mixture of polymers of said glycol is formed, said mixture having an average molecular weight from about 200 to about 1500, forming a solution of said polymers in a hydrocarbon solvent, percolating the solution through fuller's earth and hydrogenating the percolated polymer.

RUPERT C. MORRIS.
ALVA VANCE SNIDER.

REFERENCES CITED

The following references are of record in the file of this patent:

UNITED STATES PATENTS

| Number | Name | Date |
|---|---|---|
| 1,930,572 | Wait | Oct. 17, 1933 |
| 2,043,688 | Woodhouse | June 9, 1936 |
| 2,069,336 | Schmidt | Feb. 2, 1937 |
| 2,120,227 | Brant | June 14, 1938 |
| 2,253,723 | Moore | Aug. 26, 1941 |
| 2,355,823 | Schlegel | Aug. 15, 1944 |
| 2,366,042 | Morgan | Dec. 26, 1944 |
| 2,383,915 | Morgan | Aug. 28, 1945 |
| 2,383,916 | Morgan | Aug. 28, 1945 |
| 2,411,150 | Evans | Nov. 19, 1946 |
| 2,425,755 | Roberts | Aug. 19, 1947 |
| 2,425,845 | Toussaint | Aug. 19, 1947 |

FOREIGN PATENTS

| Number | Country | Date |
|---|---|---|
| 566,032 | Germany | Dec. 15, 1932 |